(12) United States Patent
Chehab

(10) Patent No.: US 12,377,463 B2
(45) Date of Patent: *Aug. 5, 2025

(54) METHOD FOR MANUFACTURING AN ALUMINUM ALLOY PART

(71) Applicant: C-TEC CONSTELLIUM TECHNOLOGY CENTER, Voreppe (FR)

(72) Inventor: Bechir Chehab, Voiron (FR)

(73) Assignee: C-TEC CONSTELLIUM TECHNOLOGY CENTER, Voreppe (FR)

( * ) Notice: Subject to any disclaimer, the term of this patent is extended or adjusted under 35 U.S.C. 154(b) by 1023 days.

This patent is subject to a terminal disclaimer.

(21) Appl. No.: 17/424,285

(22) PCT Filed: Jan. 24, 2020

(86) PCT No.: PCT/FR2020/050108
§ 371 (c)(1),
(2) Date: Jul. 20, 2021

(87) PCT Pub. No.: WO2020/095009
PCT Pub. Date: May 14, 2020

(65) Prior Publication Data
US 2022/0088681 A1  Mar. 24, 2022

(30) Foreign Application Priority Data

Jan. 24, 2019 (FR) .................................. 1900598
Jul. 30, 2019 (FR) .................................. 1908684

(51) Int. Cl.
| | |
|---|---|
| C22C 21/00 | (2006.01) |
| B22F 3/24 | (2006.01) |
| B22F 10/22 | (2021.01) |
| B22F 10/28 | (2021.01) |
| B22F 10/64 | (2021.01) |
| B23K 26/342 | (2014.01) |
| B33Y 10/00 | (2015.01) |
| B33Y 40/20 | (2020.01) |
| B33Y 70/00 | (2020.01) |

(Continued)

(52) U.S. Cl.
CPC .............. *B22F 3/24* (2013.01); *B22F 10/22* (2021.01); *B22F 10/28* (2021.01); *B22F 10/64* (2021.01); *B23K 26/342* (2015.10); *B33Y 10/00* (2014.12); *B33Y 40/20* (2020.01); *B33Y 70/00* (2014.12); *B33Y 80/00* (2014.12); *C22C 21/00* (2013.01); *C22C 21/06* (2013.01); *C22F 1/04* (2013.01); *C22F 1/047* (2013.01); *B22F 10/25* (2021.01); *B22F 10/66* (2021.01); *B22F 2301/052* (2013.01)

(58) Field of Classification Search
CPC ........................................................ B33Y 70/00
See application file for complete search history.

(56) References Cited

U.S. PATENT DOCUMENTS

| | | |
|---|---|---|
| 2017/0016096 A1 | 1/2017 | Bianco et al. |
| 2018/0214949 A1* | 8/2018 | Martin ............ B22F 5/02 |

(Continued)

FOREIGN PATENT DOCUMENTS

| | | |
|---|---|---|
| CN | 107801404 A | 3/2018 |
| FR | 2669844 A1 | 6/1992 |
| WO | 2015006447 A1 | 1/2015 |
| WO | 2018206876 A1 | 11/2018 |

OTHER PUBLICATIONS

Niu, X.P. et al., "Hydride formation in mechanically alloyed Al—Zr and Al—Fe—Zr," Scripta Metallurgica Materialia, Jan. 1, 1994, pp. 13-18, vol. 30, No. 1.

Liu Fengguo et al., "Preparation of Aluminum-Zirconium Master Alloy by Aluminothermic Reduction in Cryolite Melt," Jom: Journal of Metals, Aug. 28, 2017, pp. 2644-2647, vol. 69, No. 12.

Hu Z et al. "Phase equilibria in the AlZrCe system at 773K," Journal of alloys and compounds, Feb. 18, 2010, pp. 200-202, vol. 491, No. 1-2.

Tsakiropoulos P. et al., "Development of Al—Cr—X and Al—Cr—Zr—X alloys by rapid solidification from the melt," Materials Science Engineering, Feb. 1, 1988, pp. 143-147, vol. 98.

(Continued)

*Primary Examiner* — Christopher S Kessler
(74) *Attorney, Agent, or Firm* — McBee Moore & Vanik IP, LLC

(57) ABSTRACT

A method for manufacturing a part 20 including a formation of successive metallic layers ($20_1 \ldots 20_n$), superimposed on one another, each layer being formed by the deposition of a filler metal (15, 25), the filler metal being subjected to an energy input so as to melt and constitute, when solidifying, said layer, the method being characterized in that the filler metal (15, 25) is an aluminum alloy including the following alloy elements (weight %):

Zr: 0.5% to 2.5%, preferably according to a first variant 0.8 to 2.5%, more preferably 1 to 2.5%, still more preferably 1.3 to 2.5%; or preferably according to a second variant 0.5 to 2%, more preferably 0.6 to 1.8%, more preferably 0.6 to 1.6%, more preferably 0.7 to 1.5%, more preferably 0.8 to 1.5%, more preferably 0.9 to 1.5%, still more preferably 1 to 1.4%;

Fe: 0% to 3%, preferably 0.5% to 2.5%; preferably according to a first variant 0.8 to 2.5%, preferably 0.8 to 2%, more preferably 0.8 to 1.2; or preferably according to a second variant 1.5 to 2.5%, preferably 1.6 to 2.4%, more preferably 1.7 to 2.3%;

optionally Si: ≤0.3%, preferably ≤0.2%, more preferably ≤0.1%;

optionally Cu: ≤0.5%, preferably 0.05 to 0.5%, preferably 0.1 to 0.4%;

optionally Mg: ≤0.2%, preferably ≤0.1%, preferably <0.05%;

Other alloy elements <0.1% individually, and <0.5% all in all;

impurities: <0.05% individually, and <0.15% all in all; the remainder consisting of aluminum.

14 Claims, 4 Drawing Sheets

(51) Int. Cl.
  *B33Y 80/00*    (2015.01)
  *C22C 21/06*    (2006.01)
  *C22F 1/04*     (2006.01)
  *C22F 1/047*    (2006.01)
  *B22F 10/25*    (2021.01)
  *B22F 10/66*    (2021.01)

(56) References Cited

U.S. PATENT DOCUMENTS

| | | | |
|---|---|---|---|
| 2019/0309402 A1* | 10/2019 | Karabin | C22C 21/02 |
| 2020/0063241 A1* | 2/2020 | Adachi | C22C 21/00 |
| 2021/0102276 A1* | 4/2021 | Martin | C22C 1/0416 |
| 2021/0156005 A1 | 5/2021 | Chehab et al. | |

OTHER PUBLICATIONS

Guo C. et al., "Thermodynamic description of the Al—Fe—Zr system," Calphad computer coupling of phase diagrams and thermochemistry, Dec. 1, 2008, pp. 637-649, vol. 32, No. 4, New York, NY, US.

International Search Report of International Patent Application No. PCT/FR2020/050108 dated Jun. 23, 2020.

Okazaki K. et al., "Al—Fe—Zr Alloys for High Temperature Applications Produced by Rapid Quenching From the Melt," Materials Laboratory, Allied Corporation, Jun. 6, 1984, pp. 911-916, vol. 18, Morristown, New Jersey, US.

French Search Report of French Patent Application No. 1908684 dated Sep. 28, 2020.

* cited by examiner

[Fig. 1]
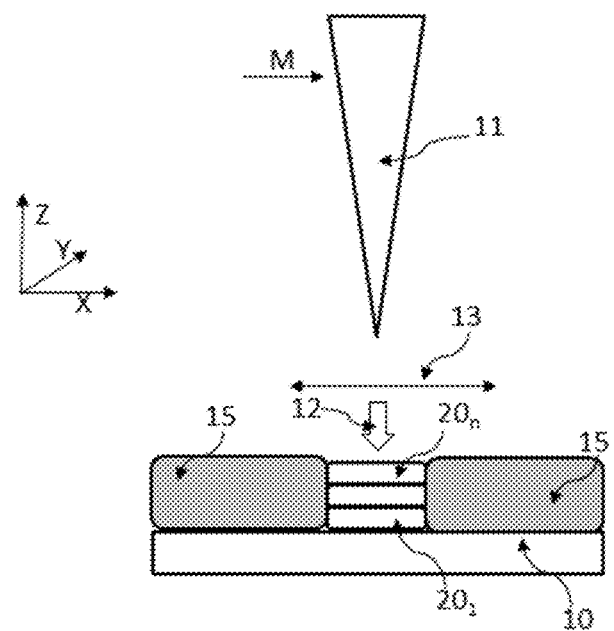

[Fig. 2]
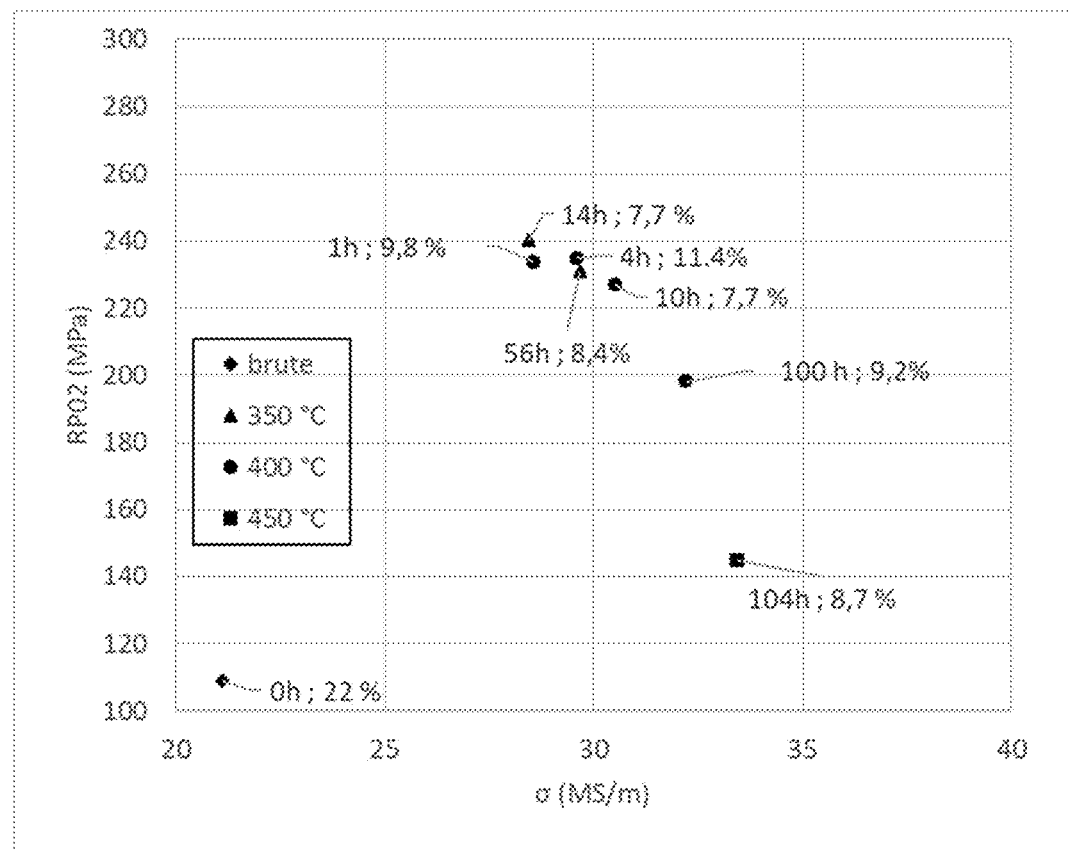
[Fig. 3]
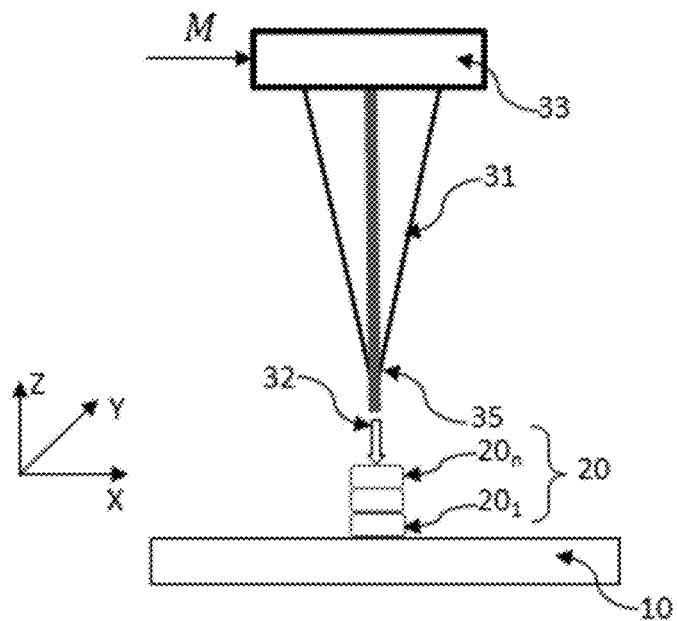

[Fig. 4]
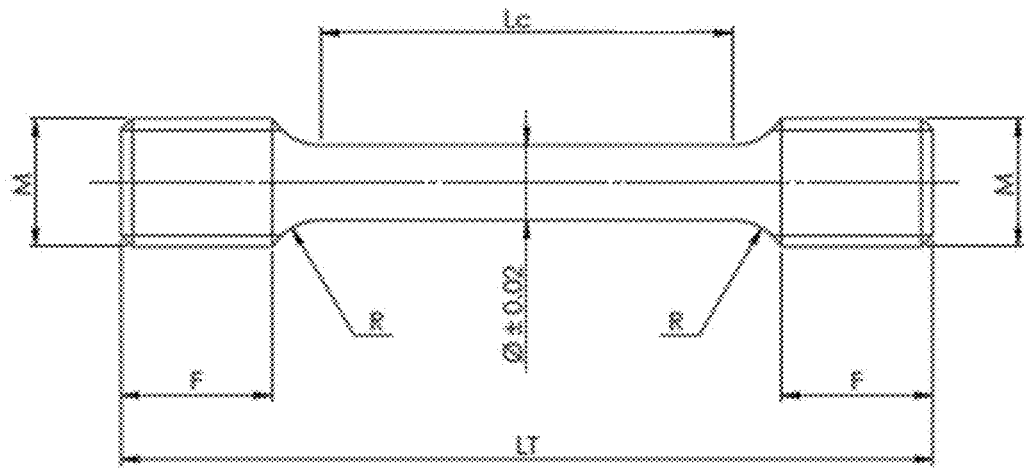
[Fig. 5]
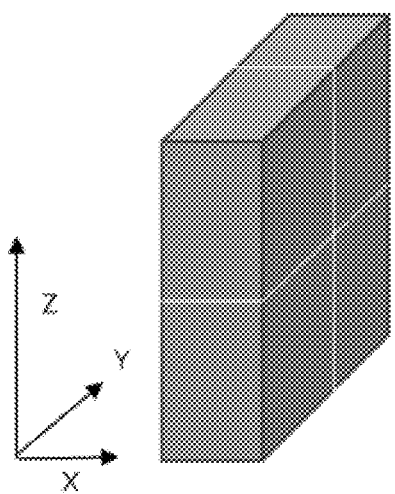

[Fig. 6]
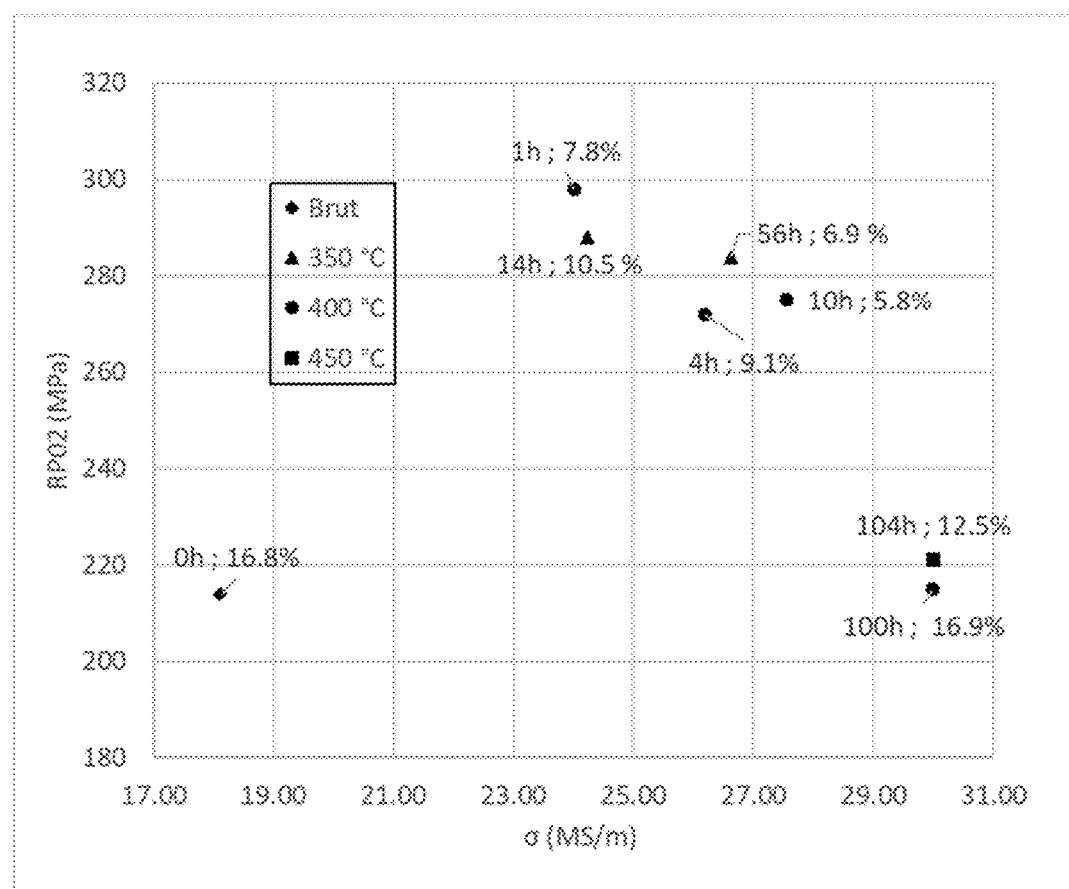

METHOD FOR MANUFACTURING AN ALUMINUM ALLOY PART

CROSS-REFERENCE TO RELATED APPLICATIONS

This application is the National Stage entry of International Application No. PCT/FR2020/050108, filed 24 Jan. 2020, which claims priority to French Patent Application No. 1908684, filed 30 Jul. 2019, and French Patent Application No. 1900598, filed 24 Jan. 2019.

BACKGROUND

Field

The technical field of the invention is a method for manufacturing a part made of an aluminum alloy, implementing an additive manufacturing technique.

Description of Related Art

Since the 80 s, additive manufacturing techniques have been developed. These consist in shaping a part by addition of matter, which is in contrast with machining techniques, aiming to remove the matter. Formerly restricted to prototyping, additive manufacturing is now operational for manufacturing industrial products in mass production, including metallic parts. The term "additive manufacturing" is defined according to the French standard P E67-001 as a "set of processes allowing manufacturing, layer after layer, by addition of matter, a physical object based on a digital object". The standard ASTM F2792 (January 2012) defines additive manufacturing too. Different additive manufacturing approaches are also defined and described in the standard ISO/ASTM 17296-1. Resort to an additive manufacture to make an aluminum part, with low porosity, has been described in the document WO2015006447. In general, the application of successive layers is carried out by application of a so-called filler material, and then melting or sintering of the filler material using an energy source such as a laser beam, an electron beam, a plasma torch or an electric arc. Regardless of the additive manufacturing approach that is applied, the thickness of each added layer is in the range of a few tens or hundreds of microns.

Other additive manufacturing methods may be used. Mention may be made for example, and without limitation, of melting or sintering of a filler material in the form of a powder. This may consist of laser melting or sintering. The patent application US20170016096 describes a method for manufacturing a part by local melting obtained by exposure of a powder to an energy beam such as an electron beam or a laser beam, the method being also referred to by the acronyms SLM, standing for "Selective Laser Melting" or "EBM", standing for "Electron Beam Melting".

The mechanical properties of the aluminum parts obtained by additive manufacturing depend on the alloy forming the filler metal, and more specifically on its composition as well as on the heat treatments applied following the implementation of the additive manufacture.

The Applicant has determined an alloy composition which, when used in an additive manufacturing method, allows obtaining parts with remarkable mechanical performances, yet without it being necessary to implement heat treatments such as dissolution and quenching. In addition, the used parts feature interesting thermal conductivity or electrical conductivity properties. This allows diversifying the possible applications of these parts.

SUMMARY

A first object of the invention is a method for manufacturing a part including a formation of successive metallic layers, superimposed on one another, each layer being formed by the deposition of a filler metal, the filler metal being subjected to an energy input so as to melt and constitute, when solidifying, said layer, the method being characterized in that the filler metal is an aluminum alloy including the following alloy elements (weight %):

- Zr: 0.5% to 2.5%, preferably according to a first variant 0.8 to 2.5%, more preferably 1 to 2.5%, still more preferably 1.3 to 2.5%; or preferably according to a second variant 0.5 to 2%, more preferably 0.6 to 1.8%, more preferably 0.6 to 1.6%, more preferably 0.7 to 1.5%, more preferably 0.8 to 1.5%, more preferably 0.9 to 1.5%, still more preferably 1 to 1.4%;
- Fe: 0% to 3%, preferably 0.5% to 2.5%; preferably according to a first variant 0.8 to 2.5%, preferably 0.8 to 2%, more preferably 0.8 to 1.2; or preferably according to a second variant 1.5 to 2.5%, preferably 1.6 to 2.4%, more preferably 1.7 to 2.3%;
- optionally Si: ≤0.3%, preferably ≤0.2%, more preferably ≤0.1%;
- optionally Cu: ≤0.5%, preferably 0.05 to 0.5%, preferably 0.1 to 0.4%;
- optionally Mg: ≤0.2%, preferably ≤0.1%, preferably <0.05%;
- Other alloy elements <0.1% individually, and <0.5% all in all;
- impurities: <0.05% individually, and <0.15% all in all;

the remainder consisting of aluminum.

Among the other alloy elements, mention may be made for example of Cr, V, Ti, Mn, Mo, W, Nb, Ta, Sc, Ni, Zn, Hf, Nd, Ce, Co, La, Ag, Li, Y, Yb, Er, Sn, In, Sb, Sr, Ba, Bi, Ca, P, B and/or a mischmetal.

Preferably, the method may include the following features, considered separately or according to technically feasible combinations:

- Zr: 0.8 to 2.5%, or preferably 1% to 2.5%, or still preferably 1.2% to 2.5%, or still preferably 1.3% to 2.5% or still preferably 1.5% to 2.5%;
- Zr: 0.5 to 2%, more preferably 0.6 to 1.8%, more preferably 0.6 to 1.6%, more preferably 0.7 to 1.5%, more preferably 0.8 to 1.5% more preferably 0.9 to 1.5%, still more preferably 1 to 1.4%;
- Fe: 0.5% to 2.5% or 0.5% to 2%; preferably 0.8 to 2.5%, preferably 0.8 to 2%, more preferably 0.8 to 1.2;
- Fe: 0.5% to 2.5% or 0.5% to 2%; preferably 1.5 to 2.5%, preferably 1.6 to 2.4%, more preferably 1.7 to 2.3%;
- Si: <0.2% and preferably <0.1%;
- Si≥0.01%, or optionally ≥0.05%;
- Cu: 0.05% to 0.5%, preferably 0.1 to 0.4%;
- Zr: 0.5% to 2.5% and Fe≥1%;
- Zr: 0.5% to 2.5% and Fe<1%;
- the weight fraction of each other alloy element is strictly lower than 500 ppm, 300 pm, 200 ppm, or optionally 100 ppm;
- the weight fraction of each impurity is strictly lower than 300 pm, 200 ppm, or optionally 100 ppm;
- the alloy includes no Cr, V, Mn, Ti, Mo, or according to a weight fraction lower than 500 ppm, 300 ppm, 200 ppm or optionally lower than 100 ppm.

According to one variant, the used alloy according to the present invention comprises Cu, according to a weight fraction from 0.05% to 0.5%, preferably from 0.1 to 0.4%.

In particular, each layer may feature a pattern defined from a digital model.

The method may include, following the formation of the layers, that is to say following the formation of the final part, an application of at least one heat treatment. The heat treatment may consist of or include tempering or annealing. It may also include dissolution and quenching, even they it is preferred to avoid these. It may also include hot isostatic pressing.

In order to enhance mechanical properties, the heat treatment may be performed:
- at a temperature higher than 400° C., in which case the duration of the heat treatment is comprised from 0.1 h to 10 h;
- or at a temperature comprised from 300° C. to 400° C., in which case the duration of the heat treatment is comprised from 0.5 h to 100 h.

In order to promote the thermal or electrical conduction properties, the heat treatment may be performed at a temperature higher than or equal to 350° C., or higher than or equal to 400° C., or a duration from 90 to 200 h, so as to obtain an optimum thermal or electrical conductivity. For example, a temperature from 380 to 470° C. and a duration from 90 to 110 h. According to an advantageous embodiment, the method includes no quenching following the formation of the layers, that is to say following the formation of the final part, or following the heat treatment. Thus, preferably, the method does not include any steps of dissolution followed by quenching.

According to one embodiment, the filler metal is in the form of a powder, whose exposure to a beam of light or of charged particles, results in a local melting followed by a solidification, so as to form a solid layer. According to another embodiment, the filler metal is derived from a filler wire, whose exposure to an electric arc results in a local melting followed by a solidification, so as to form a solid layer.

A second object of the invention is a metallic part, obtained after application of a method according to the first object of the invention.

A third object of the invention is a filler material, in particular a filler wire or a powder, intended to be used as a filler material of an additive manufacturing method, characterized in that it is constituted by an aluminum alloy, including the following alloy elements (weight %):
- Zr: 0.5% to 2.5%, preferably according to a first variant 0.8 to 2.5%, more preferably 1 to 2.5%, still more preferably 1.3 to 2.5%; or preferably according to a second variant 0.5 to 2%, more preferably 0.6 to 1.8%, more preferably 0.6 to 1.6%, more preferably 0.7 to 1.5%, more preferably 0.8 to 1.5%, more preferably 0.9 to 1.5%, still more preferably 1 to 1.4%;
- Fe: 0% to 3%, preferably 0.5% to 2.5%; preferably according to a first variant 0.8 to 2.5%, preferably 0.8 to 2%, more preferably 0.8 to 1.2; or preferably according to a second variant 1.5 to 2.5%, preferably 1.6 to 2.4%, more preferably 1.7 to 2.3%;
- optionally Si: ≤033%, preferably ≤0.2%, more preferably ≤0.1%;
- optionally Cu: ≤0.5%, preferably 0.05 to 0.5%, preferably 0.1 to 0.4%;
- optionally Mg: ≤0.2%, preferably ≤0.1%, preferably <0.05%;
- Other alloy elements <0.1% individually, and <0.5% all in all;
- impurities: <0.05% individually, and <0.15% all in all; the remainder consisting of aluminum.

The aluminum alloy forming the filler material may feature the characteristics described in connection with the first object of the invention.

The filler material may be in the form of a powder. The powder may be such that at least 80% of the particles composing the powder have an average size within the following range: 5 µm to 100 µm, preferably from 5 to 25 µm, or from 20 to 60 µm.

When the filler material is in the form of a wire, the diameter of the wire may in particular be comprised from 0.5 mm to 3 mm, and preferably comprised from 0.5 mm to 2 mm, and still preferably comprised from 1 mm to 2 mm.

Another object of the invention is the use of a powder or of a filler wire as described hereinbefore and in the rest of the description in a manufacturing method selected amongst: cold spray consolidation (CSC), laser metal deposition (LMD), additive friction stir (AFS), spark plasma sintering (FAST) or rotary friction welding (IRFW), preferably cold spray consolidation (CSC).

Other advantages and features will appear more clearly from the following description of particular embodiments of the invention, provided as non-limiting examples, and represented in the figures listed hereinbelow.

BRIEF DESCRIPTION OF THE DRAWINGS

FIG. 1 is a diagram illustrating a SLM-type additive manufacturing method.

FIG. 2 illustrates tensile and electrical conduction properties determined throughout experimental tests of Example 1, from samples manufactured by implementing an additive manufacturing method according to the invention.

FIG. 3 is a diagram illustrating a WAAM-type additive manufacturing method.

FIG. 4 is a diagram of the specimen used according to the examples.

FIG. 5 is a diagram of the second testing parts of Example 1.

FIG. 6 illustrates tensile and electrical conduction properties determined throughout experimental tests of Example 2, from samples manufactured by implementing an additive manufacturing method according to the invention.

DETAILED DESCRIPTION OF A PREFERRED EMBODIMENT

Unless stated otherwise, in the description:
- the designation of the aluminum alloys is compliant with the nomenclature of The Aluminum Association;
- the contents of the chemical elements are reported in % and represent weight fractions. The x %-y % notation means higher than or equal to x % and lower than or equal to y %.

By impurities, it should be understood chemical elements that are unintentionally present in the alloy.

FIG. 1 schematizes the operation of a Selective Laser Melting (SLM) type additive manufacturing method. The filler metal 15 is in the form of a powder disposed on a support 10. An energy source, in this instance a laser source 11, emits a laser beam 12. The laser source is coupled to the filler material by an optical system 13, whose movement is determined according to a digital model M. The laser beam 12 propagates according to an axis of propagation Z, and follows a movement according to a plane XY, describing a pattern depending on the digital model. For example, the plane is perpendicular to the axis of propagation Z. The interaction of the laser beam 12 with the powder 15 causes a selective melting of the latter, followed by a solidification, resulting in the formation of a layer $20_1 \ldots 20_n$. Once a layer has been formed, it is covered with powder 15 of the filler metal and another layer is formed, superimposed on the layer made before. For example, the thickness of the powder forming a layer may be comprised from 10 to 200 µm.

For aluminum alloys, the support 10 or tray may be heated up to a temperature ranging up to 350° C. In general, machines that are currently available on the market enable heating of the tray up to 200° C. For example, the heating temperature of the tray may be about 50° C., 100° C., 150° C. or 200° C. In general, heating of the tray allows reducing the humidity at the powder bed and also reducing the residual stresses on the parts being manufactured. The humidity level at the powder bed seems to have a direct effect on the porosity of the final part. Indeed, it seems that the higher the humidity of the powder, the higher will be the porosity of the final part. It should be noted that heating of the tray is one of the existing possibilities to carry out a hot additive manufacturing. However, the present invention should not be limited to the use of this heating means alone. All other heating means may be used in the context of the present invention to heat up and monitor the temperature, for example an infrared lamp. Thus, the method according to the present invention may be carried out at a temperature ranging up to 350° C.

The powder may have at least one of the following characteristics:

- Average particle size from 5 to 100 µm, preferably from 5 to 25 µm, or from 20 to 60 µm. The given values mean that at least 80% of the particles have an average size within the specified range.
- Spherical shape. For example, the sphericity of a powder may be determined using a morphogranulometer.
- Good castability. For example, the castability of a powder may be determined according to the standard ASTM B213 or the standard ISO 4490:2018. According to the standard ISO 4490:2018, the flow time is preferably shorter than 50.
- Low porosity, preferably from 0 to 5%, more preferably from 0 to 2%, still more preferably from 0 to 1% by volume. In particular, the porosity may be determined by analysis of images from optical micrographs or by helium pycnometry (cf. the standard ASTM B923).
- Absence or small amount (less than 10%, preferably less than 5% by volume) of small particles (1 to 20% of the average size of the powder), called satellites, which stick to the larger particles.

The implementation of such a method enables the manufacture of parts at a high yield, which may reach or optionally exceed 40 cm³/h.

Moreover, the Applicant has observed that the application of quenching-type heat treatments could induce a distortion of the part, because of the abrupt variation of temperature. In general, the distortion of the part is even more significant as its dimensions are large. Yet, the advantage of an additive manufacturing method is precisely to obtain a part whose shape, after manufacture, is permanent, or almost-permanent. Hence, the occurrence of a significant deformation resulting from a heat treatment shall be avoided. By almost-permanent, it should be understood that a finish machining might be performed on the part after manufacture thereof: the part manufactured by additive manufacturing extends according to its permanent shape, prior to finish machining.

After having noticed the foregoing, the Applicant has looked for an alloy composition, forming the filler material, allowing obtaining acceptable mechanical properties, without requiring the application of heat treatments, subsequent to the formation of the layers, that is to say after the formation of the final part, which might induce a distortion. In particular, the aim is to avoid heat treatments involving an abrupt variation of the temperature. Thus, the invention allows obtaining, by additive manufacturing, a part whose mechanical properties are satisfactory, in particular in terms of yield strength. Depending on the selected additive manufacturing method type, the filler material may be in the form of a wire or a powder.

The Applicant has noticed that by limiting the number of elements present in the alloy having a content above 1 weight %, a good trade-off between the interesting mechanical and thermal properties is obtained. It is commonly recognized that the addition of elements in the alloy allows improving some mechanical properties of the part made by additive manufacturing. By mechanical properties, it should be understood for example the yield strength and the elongation at break. However, the addition of a too large amount, or of a too wide variety, of alloy chemical elements could alter the thermal conduction properties of the part resulting from the additive manufacture. Thus, resorting to binary or ternary alloys, in an additive manufacturing method, constitutes a promising way in the additive manufacturing field.

The Applicant has considered it useful to reach a compromise between the number and the amount of elements added in the alloy, so as to obtain acceptable mechanical and thermal (or electrical) properties.

The Applicant considers that such a compromise is obtained by limiting to one or two the number of chemical elements forming the aluminum alloy having a weight fraction higher than or equal to 1%. Thus, a particularly interesting alloy may be obtained by adding, according to a weight fraction higher than 1%:

- only Zr, in which case the alloy is essentially constituted by two elements (Al and Zr). For example Zr: 0.5% to 2.5% and Fe<1%;
- only Zr and Fe, in which case the alloy is essentially constituted by three elements (Al, Zr and Fe). The presence of Fe in the alloy allows improving the mechanical properties, whether these consist of hot or cold tensile mechanical properties or hardness. For example Zr: 0.5% to 2.5% and Fe≥1%;

The presence of Zr in the alloy confers a good processability of the alloy, the term processability qualifying the ability of an alloy to be shaped by an additive manufacturing method. This is reflected, at the level of a part manufactured by additive manufacturing, by a virtual absence of crack-type defects, and by a low porosity. The Applicant has noticed that a weight fraction of Zr higher than 0.5% confers a good processability. An optimum weight fraction of Zr may be comprised according to a first variant from 0.8 to 2.5%, more preferably 1 to 2.5%, still more preferably 1.3 to 2.5%; or preferably according to a second variant from 0.5 to 2%, more preferably from 0.6 to 1.8%, more preferably from 0.6 to 1.6%, more preferably from 0.7 to 1.5%, more preferably from 0.8 to 1.5%, more preferably from 0.9 to 1.5%, still more preferably 1 to 1.4%. When Zr is lower than 0.5%, the mechanical properties are not sufficient in general.

The Applicant has observed in a SLM process and in the presence of Zr, in particular for a Zr content>0.5%, during the solidification of each layer, equiaxed grains forming at the bottom of the lasing bead from primary Al$_3$Z precipitates which form in the liquid. The primary Al$_3$Z precipitates serve as germs, from which aluminum equiaxed grains form. The rest of the lasing bead solidifies in the form of columnar grains which grow radially from the edge towards the center of the bead. The higher the Zr content, the greater will be the fraction of equiaxed grains and the lower will be the fraction of columnar grains. The presence of a sufficient fraction of equiaxed grains is beneficial to avoid crackings at the end of solidification.

However, when the Zr content is <0.5%, the concentration of primary Al$_3$Z precipitates is too low, which leads to a formation of coarse columnar grains which could cross several layers, according to an epitaxial growth, progressing from one layer to another layer. Thus, the obtained part is more sensitive to solidification cracking.

This effect of the Zr content on the sensitivity to cracking is specific to additive manufacturing methods with melting of each layer like the SLM method. In the case of a non-additive process like conventional so-called rapid solidification processes with compaction and spinning of parts from rapidly solidified thin bands or from powder, parts made of alloys with Zr contents<0.5% could be manufactured without cracking. Indeed, these processes do not require melting during the shaping step and therefore are not subject to solidification cracks.

The Applicant has also noticed that the presence of copper, ≤0.5%, preferably 0.05 to 0.5%, preferably 0.1 to 0.4%, allows improving the mechanical properties and the electrical conductivity/yield strength trade-off after heat treatment.

Preferably, the weight fraction of Zr is comprised from 0.5% to 2.5%, preferably according to a first variant from 0.8% to 2.5%, or optionally from 1% to 2.5%, or optionally from 1.2% to 2.5%, or optionally from 1.3% to 2.5%, or optionally from 1.5% to 2.5%; or preferably according to a second variant from 0.5 to 2%, or optionally from 0.6 to 1.8%, or optionally from 0.6 to 1.6%, or optionally from 0.7 to 1.5%, or optionally from 0.8 to 1.5% or optionally from 0.9 to 1.5%, or optionally from 1 to 1.4%.

When the alloy includes Fe, the weight fraction of Fe is lower than or equal to 3%. Preferably, it is comprised from 0.5% to 3%; preferably according to a first variant 0.8 to 2.5%, preferably 0.8 to 2%, more preferably 0.8 to 1.2; or preferably according to a second variant 1.5 to 2.5%, preferably 1.6 to 2.4%, more preferably 1.7 to 2.3%. An association of Zr and Fe is particularly advantageous, as mentioned before, and confirmed by experimental tests.

The alloy may also include other alloy elements, such as Cr, V, Ti, Mn, Mo, W, Nb, Ta, Sc, Ni, Zn, Hf, Nd, Ce, Co, La, Ag, Li, Y, Yb, Er, Sn, In, Sb, Sr, Ba, Bi, Ca, P, B and/or a mischmetal, according to a weight fraction individually strictly lower than 0.1% preferably lower than 500 ppm, and preferably lower than 300 ppm, or 200 ppm, or 100 ppm. However, some of these alloy elements, in particular Cr, V, Ti and Mo degrade conductivity. Cu is considered to be less detrimental to thermal and/or electrical conductivity.

The addition of Mg in the absence of a dissolution-quenching-tempering treatment, would lower the electrical or thermal conductivity without any significant impact on the mechanical properties. To that one should add its tendency to evaporate during the atomization and SLM process, especially for high-liquidus alloys like those tested according to the present invention. According to one variant, the alloy used according to the present invention comprises no Mg or in an impurity quantity, namely <0.05%.

When the alloy comprises other alloy elements, like Y, Yb, Er, Sn, In, Sb, these are preferably present according to a weight fraction strictly lower than 500 ppm, or optionally strictly lower than 300 ppm, or optionally strictly lower than 200 ppm or 100 ppm.

It should be noted that, preferably, the alloys according to the present invention are not AA6xxx type alloys, because of the absence of a simultaneous addition of Si and Mg in amounts larger than 0.2%.

As examples, the aluminum alloy used according to the present invention may comprise:
Zr 1.52%; Fe 213 ppm; Si 183 ppm; impurities: <0.05% each with cumulated impurities<0.15%;
Zr 1.23%; Fe 0.94%; impurities<0.05% each with cumulated impurities<0.15%;
Zr 0.81%; Fe 1.83%; impurities<0.05% each with cumulated impurities<0.15%; or
Zr 1.39%; Cu 0.32%; impurities<0.05% each with cumulated impurities<0.15%.

EXPERIMENTAL EXAMPLES

Example 1

First tests have been carried out using an alloy 1, whose weight composition measured by ICP included: Zr: 1.52%; Fe 213 ppm; Si 183 ppm; impurities: <0.05% each with cumulated impurities<0.15%.

Test parts have been made by SLM, using a EOS290 SLM (supplier EOS) type machine. This machine allows heating the tray on which the parts are made up to a temperature of about 200° C. The tests have been carried out with a tray heated up to about 200° C., but complementary tests have demonstrated the good processability of the alloys according to the present invention at lower tray temperatures for example 25° C., 50° C., 100° C. or 150° C.

The power of the laser was 370 W. The scan speed was equal to 1400 mm/s. The deviation between two adjacent scan lines, usually referred to by the term "scattering vector" was 0.11 mm. The layer thickness was 60 µm.

The used powder had a particle size essentially comprised from 3 µm to 100 µm, with a median of 40 µm, a 10% fractile of 16 µm and a 90% fractile of 79 µm.

First test parts have been made, in the form of solid cylinders vertical (direction Z) with respect to the construction tray which forms the base thereof in the plane (X-Y). The cylinders had a diameter of 11 mm and a height of 46 mm. Second test parts have been made, in the form of parallelepipeds having 12 (direction X)×45 (direction Y)×46 (direction Z) mm dimensions (cf. FIG. 5). All parts have been subjected to a SLM post-manufacture relaxation treatment of 4 hours at 300° C.

Some first parts have been subjected to a post-manufacture heat treatment at 350° C., 400° C. or 450° C., the duration of the treatment being comprised from 1 h to 104 h. All first parts (with and without the post-manufacture heat treatment) have been machined to obtain cylindrical tensile specimens having the following characteristics in mm (cf. Table 1 and FIG. 4): In FIG. 4 an Table 1, Ø represents the diameter of the central portion of the specimen, M the width of the two ends of the specimen, LT the total length of the specimen, R the radius of curvature between the central portion and the ends of the specimen, Lc the length of the central portion of the specimen and F the length of the two ends of the specimen.

TABLE 1

| Type | Ø | M | LT | R | Lc | F |
|---|---|---|---|---|---|---|
| TOR 4 | 4 | 8 | 45 | 3 | 22 | 8.7 |

These cylindrical specimens have been tested in tension at room temperature according to the standard NF EN ISO 6892-1 (2009 October).

Some second test parts have been subjected to a post-manufacture heat treatment, as described in connection with the first parts. The second test parts have undergone electrical conductivity tests, based on the fact that electrical conductivity evolves in a similar manner as thermal conductivity. A linear dependency relationship of thermal conductivity and of electrical conductivity, according to Wiedemann Franz law, has been validated in the publication Hatch "Aluminum properties and physical metallurgy" ASM Metals Park, Ohio, 1988.

The second test parts have been subjected to surface polishing on each 45 mm×46 mm face in preparation of the conductivity measurements using a 180 grit sandpaper. The electrical conductivity measurements have been performed on the polished faces using a Foerster Sigmatest 2.069 type measuring apparatus at 60 kHz.

Table 2 hereinafter represents, for each first test part, the heat treatment temperature (° C.), the heat treatment duration, the 0.2% yield strength Rp0.2 (MPa), the tensile strength (Rm), the elongation at break A (%), as well as the electrical conductivity (MS·m$^{-1}$). The tensile properties (yield strength, tensile strength and elongation at break) have been determined from the first test parts, according to the direction of manufacture Z, whereas the electrical properties (electrical conductivity) have been determined on the second test parts. In Table 2 hereinafter, the 0 h duration corresponds to an absence of heat treatment.

TABLE 2

| Duration (h) | Temperature (° C.) | Rp0.2 (MPa) | Rm (MPa) | A (%) | σ (MS/m) |
|---|---|---|---|---|---|
| 0 | — | 109 | 148 | 22 | 21.12 |
| 14 | 350 | 240 | 257 | 7.7 | 28.46 |
| 56 | 350 | 231 | 262 | 8.4 | 29.68 |
| 1 | 400 | 234 | 262 | 9.8 | 28.56 |
| 4 | 400 | 235 | 266 | 8.6 | 29.61 |
| 10 | 400 | 227 | 259 | 7.7 | 30.52 |
| 100 | 400 | 198 | 238 | 9.2 | 32.23 |
| 104 | 450 | 145 | 181 | 8.7 | 33.43 |

Without the application of a heat treatment, the mechanical properties are deemed to be satisfactory. However, the application of an appropriate heat treatment allows improving the yield strength, the tensile strength as well as the electrical conductivity. The beneficial effect of the heat treatment is attributed to the formation of nanometric Al$_3$Zr precipitates, which leads to a simultaneous increase of the yield strength and of the conductivity. In the absence of a heat treatment, a Zr fraction is kept trapped in the solid solution.

A remarkable aspect is that the heat treatment allows increasing the electrical conductivity quite significantly, the latter approaching that of pure aluminum (close to 34 MS/m), while also enhancing the mechanical properties in comparison with those of pure aluminum.

The parameters allowing obtaining good mechanical properties are as follows:

at 400° C., the duration being comprised from 1 h to 10 h;

at 350° C., the duration being comprised from 10 h to 100 h, bearing in mind that a duration comprised from 10 h to 20 h seems to be sufficient.

Henceforth, when a heat treatment is applied, it is preferable that its temperature is lower than 500° C. When obtaining optimum mechanical properties is privileged, the temperature of the heat treatment is preferably lower than 450° C., and for example comprised from 300° C. to 420° C.

When electrical or thermal conduction is privileged, the temperature of the heat treatment is preferably higher than or equal to 350° C. or optionally 400° C., with a duration that could exceed 100 h, for example from 90 to 200 h.

It is observed that when the heat treatment is performed at 400° C., the evolution of the tensile mechanical properties (yield strength, tensile strength), as a function of the duration of the treatment, increases at first, and then decreases. An optimum duration of the heat treatment allows optimizing the tensile mechanical properties. It is comprised from 0.1 h to 10 h at 400° C. Preferably, the heat treatment consists of tempering or annealing.

FIG. 2 illustrates the tensile properties (ordinate axis, representing the yield strength Rp0.2 expressed in MPa) as a function of the thermal conductivity properties (abscissa axis, representing the thermal conductivity expressed in MS/m). It should be recalled that the thermal conduction properties are considered to be representative of the electrical conduction properties. In FIG. 2, the percentages indicate the elongation at break. The beneficial effect of the heat treatment, both in terms of electrical conductivity as well as of yield strength, is represented by an arrow. In the legend of FIG. 2, the term "raw" means an absence of any heat treatment.

The relative density of the samples being higher than 99.5%, which reveals a porosity<0.5%, the latter having been estimated by image analysis on a polished sample section.

A second test has been carried out using:

an alloy 1 as described hereinbefore;

an alloy 2, whose weight composition measured by ICP included Al; Zr 1.78%; Fe 1.04%; Si 1812 ppm; Cu 503 ppm; impurities<0.05% each with cumulated impurities<0.15%.

Test parts similar to those described in connection with the first test have been formed.

The used powder had a particle size essentially comprised from 3 μm to 100 μm, with a median of 41 μm, a 10% fractile of 15 μm and a 90% fractile of 82 μm.

Vickers hardness Hv0.2 according to the standard ASTM E384, as well as the electrical conductivity, have been characterized on parallelepipeds parts. The hardness and conductivity measurements have been carried out in the absence of any heat treatment as well as after different heat treatments.

Table 3 summarizes the results of the characterizations. N/A means that the characteristic has not been measured.

TABLE 3

| Alloy | Heat treatment | Hv 0.2 | Electrical conductivity (Ms/m) |
|---|---|---|---|
| Alloy 2 | none | 79 | 18.11 |
| Alloy 2 | 400° C.-1 h | 92 | 24 |
| Alloy 2 | 400° C.-4 h | 99 | 26 |

TABLE 3-continued

| Alloy | Heat treatment | Hv 0.2 | Electrical conductivity (Ms/m) |
|---|---|---|---|
| Alloy 1 | none | 51.2 | 21.12 |
| Alloy 1 | 400° C.-4 h | 93 | 29.61 |

The tests confirm that:
the presence of Fe significantly improves the mechanical properties;
the application of a heat treatment improves the mechanical and electrical conduction properties.

Example 2

A second test similar to that of Example 1 has been carried out using the alloy 2 as described hereinbefore in connection with Example 1.

The used powder had a particle size essentially comprised from 3 μm to 100 μm, with a median of 41 μm, a 10% fractile of 15 μm and a 90% fractile of 82 μm.

Test parts have been made by SLM, using a EOS M290 SLM (supplier EOS) type machine. The power of the laser was 370 W. The scan speed was equal to 1250 mm/s. The deviation between two adjacent scan lines, usually referred to by the term "scattering vector" was 0.111 mm. The layer thickness was 60 μm.

As with Example 1, the addition of a heat treatment up to 100 h at 400° C. or 450° C. has allowed increasing both the mechanical strength and the electrical conductivity in comparison with the raw state after relief, as illustrated in Table 4 hereinafter and FIG. 6.

TABLE 4

| Duration (h) | Temperature (° C.) | Rp0.2 (MPa) | Rm (MPa) | A (%) | σ (MS/m) |
|---|---|---|---|---|---|
| 0 | — | 214 | 240 | 16.8 | 18.11 |
| 14 | 350 | 288 | 301 | 10.5 | 24.23 |
| 56 | 350 | 284 | 300 | 6.9 | 26.62 |
| 1 | 400 | 298 | 307 | 7.8 | 24.00 |
| 4 | 400 | 272 | 293 | 9.1 | 26.19 |
| 10 | 400 | 275 | 292 | 5.8 | 27.55 |
| 100 | 400 | 215 | 238 | 16.9 | 29.98 |
| 104 | 450 | 221 | 244 | 12.5 | 30.00 |

The alloy 2 has allowed demonstrating the positive effect of the addition of Fe on the increase of the yield strength Rp02 and of the tensile strength Rm (without a significant degradation of the electrical conductivity) in comparison with the alloy 1 of Example 1. This alloy 2 has allowed reaching, after heat treatment, Rp02 and Rm values that could not be reached by the alloy 1 of Example 1, with Rp02 values higher than 260 Mpa while preserving an electrical conductivity higher than 24 MS/m or optionally 26 MS/m.

Without being bound by theory, it seems that, in the parts manufactured by conventional methods such as machining from blocks obtained by working, Fe is present in the form of coarse intermetallics with a size ranging up to a few tens of μm. On the contrary, in the parts manufactured by selective laser melting from the alloy 2 of Example 2, Fe is present in the form of nanometric precipitates which do not have a negative impact on the corrosion resistance or on the ability of the alloy to be anodized. On the contrary, the presence of Fe-based nanometric precipitates seems to have a positive impact on corrosion resistance by inducing a lateral, rather than local, corrosion of the tested parts.

Example 3

A third test similar to that of Example 2 has been carried out using an alloy 3, whose weight composition measured by ICP included: Al; Zr 1.23%; Fe 0.94%;
impurities<0.05% each with cumulated impurities<0.15%.

The used powder had a particle size essentially comprised from 3 μm to 100 μm, with a median of 37 μm, a 10% fractile of 15 μm and a 90% fractile of 71 μm.

Test parts have been made by SLM, using a EOS M290 SLM (supplier EOS) type machine. The power of the laser was 370 W. The scan speed was equal to 1250 mm/s. The deviation between two adjacent scan lines, usually referred to by the term "scattering vector" was 0.111 mm. The layer thickness was 60 μm.

As with Example 2, the addition of a heat treatment up to 100 h at 400° C. has allowed increasing both the mechanical strength and the electrical conductivity in comparison with the raw state after relief, as illustrated in Table 5 hereinafter.

TABLE 5

| Duration (h) | Temperature (° C.) | Rp0.2 (MPa) | Rm (MPa) | A (%) | σ (MS/m) |
|---|---|---|---|---|---|
| 0 | — | 133 | 198 | 26.2 | 18.69 |
| 14 | 350 | 257 | 285 | 17.7 | 26.57 |
| 56 | 350 | 263 | 284 | 17.1 | 27.45 |
| 1 | 400 | 290 | 308 | 13.7 | 25.38 |
| 4 | 400 | 299 | 309 | 15.1 | 27.65 |
| 10 | 400 | 269 | 284 | 12 | 28.51 |
| 100 | 400 | 172 | 216 | 13.6 | 31.02 |
| 104 | 450 | 115 | 162 | 20.3 | 32.42 |

The decrease of the Zr content of the alloy 3 in comparison with that of the alloy 2 (respectively 1.23% vs 1.78% of Zr) has led to a significant increase of the values of the elongation and of the electrical conductivity, and that being so for all tested post-manufacture heat treatments (cf. Tables 4 and 5 hereinbefore). The alloy 3 also featured a raw state at manufacture that is softer than that of the alloy 2: Rp02 respectively 133 MPa vs 214 MPa. This softer raw state is advantageous in terms of processability during the SLM process, as it allows for a significant reduction of the residual stresses during the manufacture of the part. The best mechanical strengths of the alloy 3 and of the alloy 2 were similar and have been obtained for a post-manufacture heat treatment of 4 h at 400° C. vs 1 h at 400° C. respectively. Under these mechanical strength maximization conditions, the alloy 3 had the advantage of offering both a better elongation and a better electrical conductivity.

Example 4

A fourth test similar to that of Example 2 has been carried out using an alloy 4, whose weight composition measured by ICP included: Al; Zr 0.81%; Fe 1.83%;
impurities<0.05% each with cumulated impurities<0.15%.

The used powder had a particle size essentially comprised from 3 μm to 100 μm, with a median of 38 μm, a 10% fractile of 15 μm and a 90% fractile of 75 μm.

Test parts have been made by SLM, using a EOS M290 SLM (supplier EOS) type machine. The power of the laser was 370 W. The scan speed was equal to 1250 mm/s. The deviation between two adjacent scan lines, usually referred to by the term "scattering vector" was 0.111 mm. The layer thickness was 60 μm.

As with Example 2, the addition of a heat treatment up to 100 h at 400° C. or 450° C. has allowed increasing both the mechanical strength and the electrical conductivity in comparison with the raw state after relief, as illustrated in Table 6 hereinafter.

The alloy 4 has allowed demonstrating the interest of a reduction of the Zr content associated to an addition of 1.83% of Fe in comparison with the alloy 1.

The best mechanical strengths of the alloy 4 and of the alloy 1 have been obtained for a heat treatment of 4 h at 400° C. Under these mechanical strength maximization conditions, the alloy 4 featured a significant increase of Rp02 and of the elongation with a decrease of the electrical conductivity in comparison with the alloy 1, cf. Table 2 hereinbefore and Table 6 hereinafter.

TABLE 6

| Duration (h) | Temperature (° C.) | Rp0.2 (MPa) | Rm (MPa) | A (%) | σ (MS/m) |
|---|---|---|---|---|---|
| 0 | — | 118 | 215 | 18.1 | 19.16 |
| 14 | 350 | 241 | 297 | 15.9 | 24.97 |
| 56 | 350 | 267 | 313 | 12.8 | 27.61 |
| 1 | 400 | 187 | 258 | 14.9 | 23.45 |
| 4 | 400 | 278 | 316 | 18.8 | 28.1 |
| 10 | 400 | 240 | 283 | 12.9 | 29 |
| 100 | 400 | 210 | 257 | 14.2 | 30.28 |
| 104 | 450 | 127 | 186 | 20.3 | 31.64 |

Example 5

A fifth test similar to that of Example 2 has been carried out using an alloy 5, whose weight composition measured by ICP included: Al; Zr 1.39%; Cu 0.32%;

impurities<0.05% each with cumulated impurities<0.15%.

The used powder had a particle size essentially comprised from 3 μm to 100 μm, with a median of 27 μm, a 10% fractile of 11 μm and a 90% fractile of 54 μm.

Test parts have been made by SLM, using a EOS M290 SLM (supplier EOS) type machine. The power of the laser was 370 W. The scan speed was equal to 1250 mm/s. The deviation between two adjacent scan lines, usually referred to by the term "scattering vector" was 0.111 mm. The layer thickness was 60 μm.

As with Example 2, the addition of a heat treatment up to 100 h at 400° C. or 450° C. has allowed increasing both the mechanical strength and the electrical conductivity in comparison with the raw state after relief, as illustrated in Table 7 hereinafter.

The alloy 5 has allowed demonstrating the interest of a reduction of the Zr content associated to an addition of 0.32% of Cu in comparison with the alloy 1. Indeed, the alloy 5 featured both a better mechanical strength and a better elongation than the alloy 1, and that being so for all post-manufacture heat treatments tested at 350° C. and at 400° C.

The best mechanical strengths of the alloy 1 have been obtained for a heat treatment of 4 h at 400° C. Under these conditions, the alloy 5 featured a significant increase of Rp02 and of the elongation, associated to a very low decrease of the electrical conductivity, in comparison with the alloy 1, cf. Table 2 hereinbefore and Table 7 hereinafter.

The alloy 5 has allowed demonstrating the positive effect of the addition of Cu associated to a reduction of Zr on the increase of the yield strength Rp02 and of the tensile strength Rm (without a significant degradation of the electrical conductivity) in comparison with the alloy 1 of Example 1.

TABLE 7

| Duration (h) | Temperature (° C.) | Rp0.2 (MPa) | Rm (MPa) | A (%) | σ (MS/m) |
|---|---|---|---|---|---|
| 0 | — | 153 | 193 | 27.5 | 21.85 |
| 14 | 350 | 258 | 280 | 19.2 | 28.12 |
| 56 | 350 | 256 | 276 | 18.7 | 29.44 |
| 1 | 400 | 279 | 304 | 18.6 | 27.81 |
| 4 | 400 | 276 | 298 | 19.95 | 29.26 |
| 10 | 400 | 252 | 276 | 16.8 | 29.95 |
| 100 | 400 | 217 | 251 | 16.9 | 31.55 |
| 104 | 450 | 129 | 184 | 19.1 | 32.35 |

Example 6

Additional hot tensile tests have been carried out on the alloys 3 and 4 respectively described in Examples 3 and 4.

In the same manner as described in Example 1, test parts have been constructed in the form of solid cylinders vertical (direction Z) with respect to the construction tray which forms the base thereof in the plane (X-Y). The cylinders had a diameter of 11 mm and a height of 46 mm. These test parts have been made by SLM, using an EOS M290 SLM (supplier EOS) type machine and according to 2 different sets of SLM parameters referred to as Set 1 and Set 2 as follows:

Set 1:

Laser power: 370 W

Scan speed: 1250 mm/s

Scattering vector: 0.111 mm

Layer thickness: 60 μm.

Set 2:

Laser power: 370 W

Scan speed: 1307 mm/s

Scattering vector: 0.177 mm

Layer thickness: 60 μm.

All parts have been subjected to a SLM post-manufacture relaxation treatment of 4 hours at 300° C.

Some parts have been subjected to a post-manufacture heat treatment at 400° C., the duration of the treatment being comprised between 1 h and 4 h (cf. Table 8 hereinafter). All first parts (with and without post-manufacture heat treatment) have been machined to form cylindrical tensile specimens similar to those described in Example 1 (cf. FIG. 4 and Table 1 hereinbefore).

Tensile tests at high temperature (200° C.) have been carried out from tensile specimens obtained according to the standard NF EN ISO 6892-1 (2009 October). The results of these tests are summarized in Table 8 hereinafter. For each same tested condition, the alloy 4 featured better mechanical performances (Rp0.2 and Rm) than the alloy 3.

Example 6 has allowed demonstrating the positive effect of the increase of the Fe content associated to a reduction of the Zr content on the mechanical properties at high temperature (comparison between the performances of the alloy 3 and of the alloy 4).

TABLE 8

| Alloy | SLM parameter set | Duration (h) | Temperature (° C.) | RP02 (MPa) | Rm (MPa) |
|---|---|---|---|---|---|
| Alloy 3 | Set 1 | — | — | 120 | 152 |
| Alloy 3 | Set 1 | 1 | 400 | 98 | 128 |
| Alloy 3 | Set 2 | 1 | 400 | 108 | 135 |
| Alloy 3 | Set 2 | 4 | 400 | 111 | 138 |
| Alloy 4 | Set 1 | — | — | 127 | 168 |
| Alloy 4 | Set 1 | 1 | 400 | 126 | 156 |
| Alloy 4 | Set 2 | 1 | 400 | 131 | 158 |
| Alloy 4 | Set 2 | 4 | 400 | 145 | 158 |

According to one embodiment, the method may include a hot isostatic pressing (HIP). In particular, the HIP treatment may allow improving the elongation properties and the fatigue properties. The hot isostatic pressing may be carried out before, after or instead of the heat treatment. Advantageously, the hot isostatic pressing is carried out at a temperature from 250° C. to 500° C. and preferably from 300° C. to 450° C., at a pressure from 500 to 3000 bars and over a duration from 0.5 to 50 hours.

In particular, the possible heat treatment and/or the hot isostatic pressing allows increasing the hardness or the yield strength and the electrical conductivity of the obtained product. However, it should be noted that, in general, the higher the temperature, the more the (electrical or thermal) conductivity will be favored to the detriment of the mechanical strengths.

According to another embodiment, suited to alloys with structural hardening, it is possible to carry out a dissolution followed by quenching and tempering of the formed part and/or a hot isostatic pressing. In this case, the hot isostatic pressing may advantageously replace the dissolution.

However, the method according to the invention is advantageous, because it preferably does not require any dissolution treatment followed by quenching. The dissolution may have a detrimental effect on the mechanical strength in some cases by participating in an enlargement of dispersoids or fine intermetallic phases.

According to one embodiment, the method according to the present invention further includes, optionally, a machining treatment, and/or a chemical, electrochemical or mechanical surface treatment, and/or a vibratory finishing. In particular, these treatment may be carried out to reduce the roughness and/or improve the corrosion resistance and/or improve the resistance to fatigue cracking.

Optionally, it is possible to carry out a mechanical deformation of the part, for example after the additive manufacture and/or before the heat treatment.

Although described in connection with a SLM-type additive manufacturing method, the method may be applied to other WAAM-type additive manufacturing methods, mentioned in connection with the prior art. FIG. 3 represents such an alternative. An energy source 31, in this instance a torch, forms an electric arc 32. In this device, the torch 31 is held by a welding robot 33. The part 20 to be manufactured is disposed on a support 10. In this example, the manufactured part is a wall extending according to a transverse axis Z perpendicular to a plane XY defined by the support 10. Under the effect of the electric arc 12, the filler wire 35 melts so as to form a welding bead. The welding robot is controlled by a digital model M. It is moved so as to form different layers $20_1 \ldots 20_n$, stacked on one another, forming the wall 20, each layer corresponding to a welding bead. Each layer $20_1 \ldots 20_n$ extends in the plane XY, according to a pattern defined by the digital model M.

Preferably, the diameter of the filler wire is smaller than 3 mm. It may be from 0.5 mm to 3 mm and is preferably from 0.5 mm to 2 mm, or optionally from 1 mm to 2 mm. For example, it is 1.2 mm.

Moreover, other methods may be considered, for example, and without limitation:
  Selective Laser Sintering (or SLS);
  Direct Metal Laser Sintering (or DMLS);
  Selective Heat Sintering (or SHS);
  Electron Beam Melting (or EBM);
  Laser Melting Deposition;
  Direct Energy Deposition (or DED);
  Direct Metal Deposition (or DMD);
  Direct Laser Deposition (or DLD);
  Laser Deposition Technology;
  Laser Engineering Net Shaping;
  Laser Cladding Technology;
  Laser Freeform Manufacturing Technology (or LFMT);
  Laser Metal Deposition (or LMD);
  Cold Spray Consolidation (or CSC);
  Additive Friction Stir (or AFS);
  Field Assisted Sintering Technology, FAST or spark plasma sintering; or
  Inertia Rotary Friction Welding (or IRFW).

The solutions according to the invention are particularly suited for the so-called "cold spray" method, in particular because of a low hardness of the powder, which facilitates deposition. Afterwards, the part may be hardened through a hardening annealing (heat post-treatment). The solutions according to the present invention are particularly suited for applications in the electrical, electronic and heat-exchanger fields.

The invention claimed is:

1. A powder, intended to be used as a filler material of an additive manufacturing method, comprising an aluminum alloy, consisting of the following alloy elements (weight %):
  Zr: 0.5% to 2.5%, optionally 0.8 to 2.5%, more optionally 1 to 2.5%, optionally 1.3 to 2.5%, optionally 0.5 to 2%, optionally 0.6 to 1.8%, optionally 0.6 to 1.6%, optionally 0.7 to 1.5%, optionally 0.8 to 1.5%, optionally 0.9 to 1.5%, optionally 1 to 1.4%;
  Fe: 0.5% to 2.5%, optionally 0.8 to 2.5%, optionally 0.8 to 2%, optionally 0.8 to 1.2, or optionally 1.5 to 2.5%, optionally 1.6 to 2.4%, optionally 1.7 to 2.3%;
  optionally Si: ≤0.3%, optionally ≤0.2%, optionally ≤0.1%;
  optionally Cu: ≤0.5%, optionally 0.05 to 0.5%, optionally 0.1 to 0.4%;
  optionally Mg: ≤0.2%, optionally ≤0.1%, optionally <0.05%;
  other alloy elements <0.1% individually, and <0.5% all in all, wherein the other alloy elements are selected from the group consisting of: Cr, V, Ti, Mn, Mo, W, Nb, Ta, Sc, Ni, Zn, Hf, Nd, Ce, Co, La, Ag, Li, Y, Yb, Er, Sn, In, Sb, Sr, Ba, Bi, Ca, P, B and a mischmetal;
  impurities: <0.05% individually, and <0.15% all in all;
  remainder aluminum.

2. A product comprising the powder according to claim 1, adapted for a manufacturing method selected amongst: cold spray consolidation (CSC), laser metal deposition (LMD), additive friction stir (AFS), spark plasma sintering (FAST) or rotary friction welding (IRFW), optionally cold spray consolidation (CSC).

3. A method for manufacturing a part comprising forming successive metallic layers, superimposed on one another, each layer being formed by deposition of a filler metal, the filler metal being subjected to an energy input so as to melt and constitute, when solidifying, said layer, wherein the filler metal is an aluminum alloy consisting of the following alloy elements (weight %):

- Zr: 0.5% to 2.5%, optionally 0.8 to 2.5%, optionally 1 to 2.5%, optionally 1.3 to 2.5%, or optionally 0.5 to 2%, optionally 0.6 to 1.8%, optionally 0.6 to 1.6%, optionally 0.7 to 1.5%, optionally 0.8 to 1.5%, optionally 0.9 to 1.5%, optionally 1 to 1.4%;
- Fe: 0.5% to 2.5%, optionally 0.8 to 2.5%, optionally 0.8 to 2%, optionally 0.8 to 1.2, or optionally 1.5 to 2.5%, optionally 1.6 to 2.4%, optionally 1.7 to 2.3%;
- optionally Si: ≤0.3%, optionally ≤0.2%, optionally ≤0.1%;
- optionally Cu: ≤0.5%, optionally 0.05 to 0.5%, optionally 0.1 to 0.4%;
- optionally Mg: ≤0.2%, optionally ≤0.1%, optionally <0.05%;
- other alloy elements <0.1% individually, and <0.5% all in all, wherein the other alloy elements are selected from the group consisting of: Cr, V, Ti, Mn, Mo, W, Nb, Ta, Sc, Ni, Zn, Hf, Nd, Ce, Co, La, Ag, Li, Y, Yb, Er, Sn, In, Sb, Sr, Ba, Bi, Ca, P, B and a mischmetal;
- impurities: <0.05% individually, and <0.15% all in all;
- remainder aluminum.

4. The method according to claim 3, wherein the weight fraction of each other alloy element is lower than 300 ppm, or optionally lower than 200 ppm, or optionally lower than 100 ppm.

5. The method according to claim 3, wherein:
Zr: 0.5% to 2.5%;
Fe≥1%.

6. The method according to claim 3, wherein:
Zr: 0.5% to 2.5%;
Fe: <1%.

7. The method according to claim 3, including, following the formation of the layers, to form a final part, applying a heat treatment.

8. The method according to claim 7, wherein the heat treatment comprises tempering or annealing.

9. The method according to claim 7, wherein the heat treatment is performed:
- at a temperature higher than 400° C., in which case duration of the heat treatment is comprised from 0.1 h to 10 h;
- or at a temperature comprised from 300° C. to 400° C., in which case duration of the heat treatment is comprised from 0.5 h to 100 h.

10. The method according to claim 7, wherein the heat treatment is performed at a temperature higher than or equal to 350° C., or optionally higher than or equal to 400° C., or a duration from 90 to 200 h.

11. The method according to claim 7, wherein there is no quenching following the formation of the layers to form a final part, or following the heat treatment.

12. The method according to claim 3, wherein said method is carried out at a temperature ranging up to 350° C.

13. The method according to claim 3, wherein the filler metal is in the form of a powder, wherein exposure thereof to a beam of light and/or to charged particles results in a local melting followed by a solidification, so as to form a solid layer.

14. The method according to claim 3, wherein the filler metal is derived from a filler wire, wherein exposure thereof to a heat source results in a local melting followed by a solidification, so as to form a solid layer.

* * * * *